Oct. 17, 1939.  S. B. WILSON  2,176,618
OIL INDICATOR
Filed Nov. 3, 1936
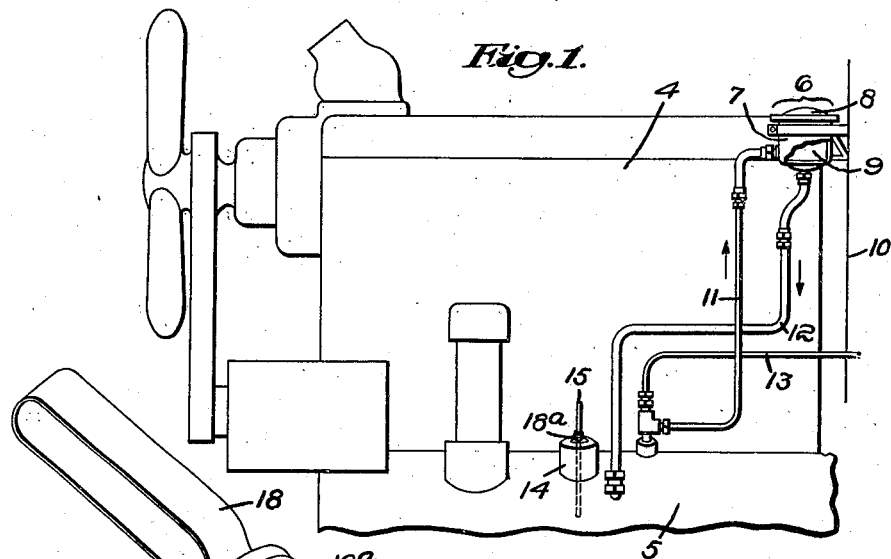
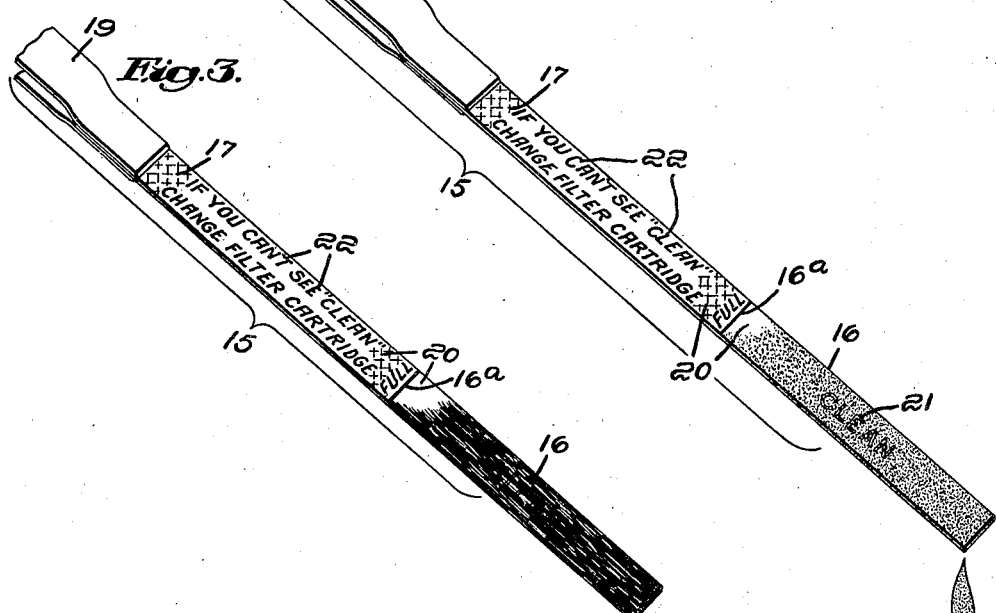
Inventor:
Steven B. Wilson,
by Emery, Booth, Townsend, Miller & Weidner
Attys Patented Oct. 17, 1939

2,176,618

UNITED STATES PATENT OFFICE 2,176,618

OIL INDICATOR

Steven B. Wilson, Newton, Mass., assignor to Fleming Manufacturing Company, East Providence, R. I., a corporation of Rhode Island Application November 3, 1936, Serial No. 109,003

8 Claims. (Cl. 88—14)

My present invention relates to the lubrication of internal combustion engines and more particularly aims to provide novel means for maintaining an efficient condition of the lubricating system of such engines in general and especially those wherein the lubricating system includes a filtering device or element intended to be manipulated, renewed or otherwise changed after reaching a condition of reduced efficiency. In its broader aspects, however, the invention is applicable either in connection with or independently of filter means, as will be apparent from the following description.

In the drawing illustrating by way of example one embodiment of my invention:

Fig. 1 shows, partly diagrammatically, an internal combustion engine incorporating the invention;

Fig. 2 illustrates, on a larger scale, the oil gauge or so-called dipstick of Fig. 1, as in the proper normal operating condition of the lubricating system;

Fig. 3 is a view similar to a portion of Fig. 2 but showing the dipstick as when signaling for a change with respect to the oil system, and simultaneously indicating a change to be effected; and Fig. 4 is a decalcomania applicable to a dipstick to provide signaling and indicating means therefor as in Figs. 2 and 3.

Referring more particularly to the drawing, and first to Fig. 1, I have there shown an internal combustion engine 4 having a crank case 5. The oil filtering system, in the illustrated example, includes a filtering device indicated as a whole by the numeral 6. As shown, it comprises a filter case or container 7 having a removable cover 8 and containing a replaceable filtering element or cartridge 9. Such filter device 6 may be mounted on any convenient part, as upon the dash 10 and is connected with the oil supply in the crank case 5 as by means of an intake conduit 11 and a return conduit 12 for the filtered oil. A conduit 13 may be provided in the usual manner, leading to the customary oil pressure indicator on the instrument panel. It will be understood that the present invention is not confined to use in connection with engine lubricating systems equipped for filtering the oil, although having one important utility specifically in such connection. When employed in association with filter means, as in the instance here selected for illustration, the invention is equally applicable in connection with systems in which the entire filter unit including the case is intended to be renewed periodically as well as to those having provision for cleaning as contrasted with replacement of the unit or the filtering element proper thereof.

Again considering Fig. 1, there is provided in the usual manner at a conveniently available portion of the crank case 5 a seat such as the boss or the like 14 enclosing an aperture leading into the crank case and giving access to the oil supply therein, for inspection purposes. This inspection aperture and seat 14 normally receive and support an oil gauge or so-called dipstick, herein indicated as a whole by the numeral 15.

The invention contemplates as a main object to provide a visual signal relative to the oil condition, and to indicate a change or corrective action to be taken, a further and highly important object being so to locate or present such signal and indication that the presence or absence thereof must necessarily be observed by or brought to the attention of the operator at relatively frequent intervals, such as every few hundred miles of travel of the motor vehicle powered by the engine illustrated.

As a feature of the invention, I utilize for this purpose the oil gauge or dipstick, in the manner to be described, by constructing and arranging said element to afford the stated functions. In actual practice I have found said element particularly suitable for the purpose, since it is, and must be, periodically examined to check on the presence and the quantity of the oil. In accordance with the invention I supply in association with the dipstick and by a special adaptation thereof a novel, and inescapable signal and corrective indication having to do with the quality or efficiency condition of the oil. The inescapable character of the signal and indication is due to the fact that the dipstick must be examined frequently, generally every time that gasolene is supplied to the automobile, in order to keep the latter in operating condition. The most negligent or careless operator or service person must look at the dipstick at least every few hundred miles, and at most service stations and garages it is forced to the operator's attention. Even if examination of the dipstick is refused by the operator, generally he is at least reminded that it should be examined, with the result that it is inspected at an early occasion when the gasolene supply is replenished.

With the foregoing important considerations in mind, and referring now more particularly to Figs. 2 and 3, the dipstick there shown as illustrative of the invention comprises an elongated body portion in the form of a rod or blade, including a lower portion or gauge proper 16 adapted to dip into the oil supply in the crank case when the dipstick is in operative position closing the inspection aperture, substantially as shown in Fig. 1. The lower or gauge portion 16 generally comprises an extension of an intermediate portion 17 which terminates, externally of the crank case, in a handle portion or grip 18, adapted to be grasped in the course of withdrawing, inspecting and replacing the dipstick. The dipstick preferably also includes a limiting stop 18ª to abut the seat 14, and spring retaining means 19, integrally or otherwise formed.

As stated, my invention is concerned with the maintenance of efficiency of the lubricating systems of internal combustion engines, especially for motor vehicles. Heretofore so far as I am aware there has been no satisfactory way or practicable means of accurately and reliably determining when such a condition of the oil has arrived as to call for a change, whether a change of the oil itself or a change by way of adjustment or replacement of some part of the lubricating system, such as in connection with the oil filter means, if any. In accordance with my invention means is provided for definitely indicating or signaling a call for such change, and in association therewith means may also be provided, if desired but not necessarily, for designating a change to be effected.

For this purpose the lower or gauge portion proper 16 of the dipstick, below the "Full" index 16ª, is equipped with visual indicating or signaling means 21 whereby it may readily be determined, visually, whether the oil condition is satisfactory or otherwise, as to lubricating efficiency and particularly cleanness or clarity. Such means comprises a distinctive indicating or signaling device on said portion of the dipstick, in position where it will be covered by the oil at a normal level thereof. It is of such character and so constructed and arranged that it will readily be visually discernible through or in the presence of a film of oil which is of sufficient clarity and cleanness that no corrective act is called for (see Fig. 2), but will be obscured or obliterated by the oil film when the oil is clouded or dirtied to an extent showing that a corrective action, such as a change of oil, or an alteration, with respect to the filter system, is in order (see Fig. 3).

Such indicating means may be variously provided and constructed. For example, it may be formed by embossing, stamping, etching, printing or otherwise applying visually modifying formations on the gauge portion of the dipstick. Preferably, and as herein indicated, such formations will be in the form of indicia or lettering, desirably comprising some pertinent informative device such as the word "Clean". Such signaling formations may have a distinctive coloring, contrasting with the adjacent surface of the dipstick and with the usual lubricant when in clean or useful condition, and as stated may be variously applied but desirably in such manner that they will withstand, and remain serviceable under, long periods of submersion in the engine lubricating oil under the temperature and operating conditions ordinarily present in the crank case of an internal combustion engine.

One form of such means, as represented in the accompanying drawing, comprises a decalcomania 20, shown separately in Fig. 4, and in operative position in Figs. 2 and 3, having on one part, corresponding to the gauge portion proper 16 of the dipstick, the lettered indicia "Clean", as indicated at 21, and having on another portion, in cooperative relation with said indicating or signaling means of the first or lower portion, other suitable associated indicia or legends such as indicated at 22. Any appropriate legend or indicia may be employed, depending on the particular change intended to be made to correct the condition, such as the wording "If you can't see 'Clean' change filter cartridge", thereby designating, in conjunction with the indicating means at the lower portion of the dipstick, the appropriate change, alteration, adjustment or corrective act to be performed, in this particular instance the replacement of the filter cartridge forming a part of the particular oil filter system, the engine in this illustrative example being equipped for oil filtering. The decalcomania as shown preferably also bears the line and legend, such as "Full", as generally present on the dipstick, as in Figs. 2 to 4, to indicate the proper oil level. In other instances the directive indication might be "Change oil", or "Clean the filter", or "Install new filter assembly", or other instruction appropriate to the particular case.

The portion of the decalcomania or of the dipstick carrying the means indicative of the particular change may further be rendered distinctive, as by distinctively coloring it, such coloration being herein indicated by the lining representative for example of the color yellow. The gauge portion of the decalcomania or of the dipstick bearing the condition signaling means may also be colored to assist in rendering said means readily distinctive and visible, under proper oil conditions, such as represented in Fig. 2, as by the application or use of a contrasting color, preferably of a light-reflecting character, such as white.

Thus it is contemplated that the color of the indicating device or indicia, such as the word "Clean" on the oil-contacting or gauge portion of the dipstick will have a color value, either as to hue or as to tone, or both, including brightness, tint, or shade, such that the indicia is calculated to be obscured or made illegible when the color of the oil reaches any predetermined and generally approximately corresponding value which is distinctive of a selected degree of contamination of the oil, as determined in advance by the filter manufacturer or the maker of the automobile or engine. In making the color calculation the inherent or natural color of the proper or recommended oil and its degree of change in color on approaching the critical or unsafe condition as to dirtiness is taken into consideration. Thus for certain oils, filters and engines the predetermined color value may, for example, be russet, or some other calculated tone and hue. In this manner the "Change" point or any critical condition to be indicated, as to dirtiness or contamination of the oil, may be predeterminedly set or regulated to suit the particular conditions of use.

In Fig. 3 I have illustrated the dipstick of Fig. 2 under conditions signaling or calling for a corrective change. In this instance the oil, represented by the heavily shaded lower portion of the figure, as contrasted with its clean condition shown by the stippling in Fig. 2, has become so contaminated as to obscure and substantially obliterate or render illegible the signaling means 21, thereby indicating the necessity for a change, the character of which is in turn signaled or indicated by the associated indicia 22, in this particular instance the change appropriate being a replacement of the filter cartridge 9.

The useful condition of the lubricating oil of an internal combustion engine, as determined by its color or light value, is dependent on various factors associated with the operating condition of the engine, such as carbonization, engine temperature, and others. In this connection, it is a recognized fact that oil filters for internal combustion engines, such as herein illustrated and described by way of example, become clogged and relatively inefficient abnormally rapidly where the lubricating oil has become excessively diluted with gasoline or water, and particularly the latter. This is probably due to a swelling action of the diluent on the filtering material, reducing the open area of the pores or apertures of said material. Hence in the presence of such excess dilution of the oil, the filtering efficiency rapidly decreases and the oil accordingly becomes contaminated, by reason of failure of the filter, at a much earlier time. It will therefore be understood that an excessively early arrival of an objectionably contaminated condition of the oil will generally be indicative of excessive oil dilution. The means of my present invention, whereby a predetermined degree of contamination of the oil is visually indicated, accordingly constitutes means for indicating when the oil is diluted with excess amounts of water. If, after cleaning or replacing the filter element and supplying proper fresh oil, the calculated condition of oil contamination again shortly appears this is an indication of excessive oil dilution arising from some improper engine or other condition requiring correction.

From the foregoing description of my invention and the accompanying illustration thereof it will be apparent that the invention comprises means for determining the condition of the engine oil as to its lubricating efficiency as evidenced by its clarity or cleanness and in such manner as to signal the requirement for a corrective change, and specially may include means for indicating the character of change required.

It will be understood that my invention is not limited to the exemplary embodiment herein illustrated or described, and I set forth its scope in my following claims.

I claim:

1. An oil inspecting device of the immersion or dipstick type comprising a stick having a lower portion for immersion in the oil, said portion having thereon a distinctive indicating area of such light-reflective property as to be obscured by oil thereon of a predeterminedly impaired clarity, and additional means on said device informing as to the action to be taken in the event of obscuration of said indicating area, said means so located as to be readily visible to one taking a reading of said indicating area.

2. In combination with an internal combustion engine having a lubricating system wherein a corrective change is to be made at a predetermined condition of oil contamination, an oil-level gauge for indicating the level of oil in the engine crank case, means on the oil-level gauge in position readily examinable by a person in reading the level indication, for indicating the presence or absence of said predetermined condition of oil-contamination, and other means on said oil-level gauge and also readily subject to view in reading the oil-level indication, for informing as to the particular corrective change to be made in the event of the indicated presence of said predetermined condition of oil contamination.

3. An oil inspecting device of the immersion or dipstick type comprising a stick having applied to a substantial surface area of its lower portion to be immersed in the oil a distinctive visually modifying formation of a light-reflectivity such that it is rendered indistinguishable when covered by a film of oil at a predetermined degree of impaired clarity which is short of opacity at least to such an extent that the quantity markings on the usual device of said type would not then be obscured, thereby to obtain by inspection of said stick portion a visual indication of said non-opaque but determined degree of impaired clarity of the oil.

4. An oil clarity determining device comprising a rod having a supporting portion and a portion adapted to be immersed in the oil of a lubricating system, said immersible portion having on a prominent area thereof colored clarity-determining surface means, the color value of said means being so related to a less-than-opaque stage of dirtying of the oil that said means is obscured by a covering film of the oil at said stage thereby to afford a visual indication of the presence of said oil condition.

5. An oil inspecting device of the immersion or dipstick type comprising a stick having applied to its lower portion to be immersed in the oil a distinctive visually modifying surface formation of a selected light-reflectivity such that it is rendered substantially indistinguishable, under usual service conditions of illumination, through the thin film of oil retained by said stick portion on withdrawal from immersion in the oil, when the oil of said film has reached a predetermined degree of impaired clarity which is short of opacity, thereby to obtain by inspection of said stick portion a visual indication that the oil has reached said predetermined degree of impaired clarity.

6. An oil inspecting device for lubricating systems, said device comprising a rod having a supporting portion and a portion to receive an oil film by immersion in the oil, said immersible portion having indicia including a maximum or "full" index determinative of the quantity of the oil by the upward extent of the film relative thereto, and said immersible portion having below said quantity index, in position to be covered by the same film area which affords the quantity determination, a distinctive, substantially smooth, planular visually-modifying surface formation of a selected light-deflectivity so modified from that of the normal non-mirror-finished rod material that said formation is substantially obscured, under usual service conditions of illumination, by the oil film retained by the immersible rod portion on withdrawal from the oil, when the oil has reached a predetermined degree of impaired clarity short of opacity, thereby to indicate said oil condition.

7. An oil inspecting device of the immersion or dipstick type comprising a stick having its lower portion adapted to be immersed in the oil provided with a distinctive visually-modifying surface formation of a selected light reflectivity such that it is substantially obscured under usual service conditions of illumination by the thin film of oil retained by said stick portion on withdrawal from immersion in the oil when the oil of said film has reached a predetermined degree of impaired clarity which is short of opacity, thereby to obtain by inspection of said stick portion a visual indication that the oil has reached said predetermined degree of impaired clarity.

8. An oil inspecting device of the immersion or dipstick type comprising a stick having its lower portion adapted to be immersed in the oil provided with a coating constituting a distinctive visually modifying surface formation of a selected light reflectivity such that it is substantially obscured under usual service conditions of illumination by the thin film of oil retained by said stick portion on withdrawal from immersion in the oil when the oil of said film has reached a predetermined degree of impaired clarity which is short of opacity, thereby to obtain by inspection of said stick portion a visual indication that the oil has reached said predetermined degree of impaired clarity.

STEVEN B. WILSON.